United States Patent [19]

Abdenour

[11] Patent Number: 4,487,114
[45] Date of Patent: Dec. 11, 1984

[54] BREWING IMPROVEMENT

[76] Inventor: Joseph D. Abdenour, 496 St. Clair, Grosse Pointe, Mich. 48230

[21] Appl. No.: 153,317

[22] Filed: May 27, 1980

[51] Int. Cl.³ .......................................... A47J 31/06
[52] U.S. Cl. ...................................... 99/295; 99/306; 99/308
[58] Field of Search ................... 426/77, 433; 99/306, 99/316, 317, 304, 308–315, 295; 210/474, 477, 478, 479, 482

[56] References Cited

U.S. PATENT DOCUMENTS

| | | | |
|---|---|---|---|
| 192,243 | 7/1877 | Sherwood | 99/313 |
| 2,062,897 | 12/1936 | Michel | 99/295 X |
| 2,199,592 | 5/1940 | Holmes | 99/315 X |
| 2,273,422 | 2/1942 | Schroeder | 99/306 X |
| 2,732,787 | 1/1956 | Osborne | 99/306 |
| 2,743,664 | 5/1956 | Dale | 99/306 X |
| 2,948,618 | 8/1960 | Saint | 426/433 |
| 3,139,344 | 6/1964 | Weisman | 99/306 X |
| 3,166,003 | 1/1965 | Merson | 99/306 |
| 3,266,411 | 8/1966 | Oakley | 99/304 |
| 3,539,049 | 11/1970 | D'Eustachio | 210/477 |
| 3,682,321 | 8/1972 | Smith | 210/477 |
| 3,694,235 | 9/1972 | Siegel | 99/295 X |
| 3,823,656 | 7/1974 | Veken | 99/306 X |
| 4,061,793 | 12/1977 | Daswick | 426/433 |
| 4,070,956 | 1/1978 | Brown | 99/315 |
| 4,167,136 | 9/1979 | Chupurdy | 99/306 |
| 4,167,899 | 9/1979 | McCormick | 99/316 X |

FOREIGN PATENT DOCUMENTS

| | | | |
|---|---|---|---|
| 1214364 | 11/1959 | France | 426/77 |
| 1351752 | 5/1974 | United Kingdom | 210/482 |

Primary Examiner—Hiram H. Bernstein
Attorney, Agent, or Firm—David A. Maxon

[57] ABSTRACT

Structure for maintaining and controlling qualitative and quantitative parameters of brewing, particularly related to coffee.

28 Claims, 9 Drawing Figures

BREWING IMPROVEMENT

This invention relates generally to brewing. More particularly, this invention relates to the control of purity and qualitative and quantitative parameters of brewing coffee and like beverages.

Prior to this invention, it has been a common practice in the art of brewing coffee to use a plurality of structures for maintaining controlled flow of liquid through comminuted particles in the process of forming a beverage solution. A variety of pots and apertured devices have been used. Portions of these structures have been disposable, while other portions require washing in order to maintain the quality and purity of the brew.

One of the problems of these past efforts has been the necessity to provide the labor to perform the washing process subsequent to the brewing process. Another problem has been the time delay required for the washing between successive operations of brewing. Where attempts have been made to economize on the labor involved, not washing between every brewing operation, the quality and purity of the brewed product has suffered.

Accordingly, it is an object of this invention to provide means for brewing wherein all of the structure containing liquid that is partially or entirely in solution for the ultimate brewed product can be utilized with the complete elimination of any washing operation.

It is another object of this invention to provide structure for brewing wherein such structure is inexpensive and uncomplicated to make and use.

It is a still further object of this invention to provide an improved brewing process completely free of contaminants that may have been deposited on structures in prior brewing batches wherein the brewing process comprises a plurality of successive batches.

It is a still further object of this invention to provide an improved brewing process wherein the components of that process are inexpensive to manufacture and use.

It is a still further object of this invention to provide an improved brewing process wherein the brew basket, in combination with an unlipped coffee pot, can provide means for the pouring of liquid from the pot without structural modification of the pot itself.

It is a still further object of this invention to provide an improved brewing process wherein the components of that process allow for prepackaged coffee to be brewed therein as well as loose coffee to be brewed therein, and having means for venting the components thereof of gases during high temperature application, and to be sufficiently inexpensive to make, use and sell, to allow disposability and the use of fresh apparatus for subsequent brew.

It is a still further object of this invention to provide an improved brewing process wherein components of that process include a brew basket that has raised and lowered areas proximate apertures for the allowing of brew to pass therethrough that is capable of inexpensive and precise manufacture using dies.

These and other objects of this invention are achieved by the provision of a brew basket member; a cap member; and a cup member. The brew basket cooperates with the cup member in such a manner as to provide upper extending flow conduit configuration means to allow the pouring of brew from the cup. Also provided in the brew basket member is a vent to allow gases to replace the volume displaced by the flow of liquid from the cup. The cap member has apertures to allow the flow of water therethrough into the brew basket and also has vent portions to allow the venting of gas from the brew basket that is displaced by the infusion of water flow thereinto. The brew basket member has raised and lowered portions on the bottom thereof proximate relatively large apertures for the passing of brew product therethrough. A filter paper inserted in the brew basket and covering the aforementioned raised and lowered areas in the bottom thereof allows the filtering of the brew therethrough into the cup member below. Alternatively, coffee may be packaged in filter paper and placed on the raised sections of the bottom of the brew basket to allow the filtering of the solute therethrough.

These and other objects of this invention can be appreciated from the foregoing specifications and claims.

ON THE DRAWINGS

Before explaining the present invention in detail, it is to be understood that the invention is not limited in its application to the details in construction and arrangement of parts illustrated in the accompanying drawings, since the invention is capable of other embodiments and of being practiced or carried out in various ways. Also, it is to be understood that the phraseology and terminology employed herein are for the purpose of description and not of limitation.

AS SHOWN ON THE DRAWINGS

Figure 1:
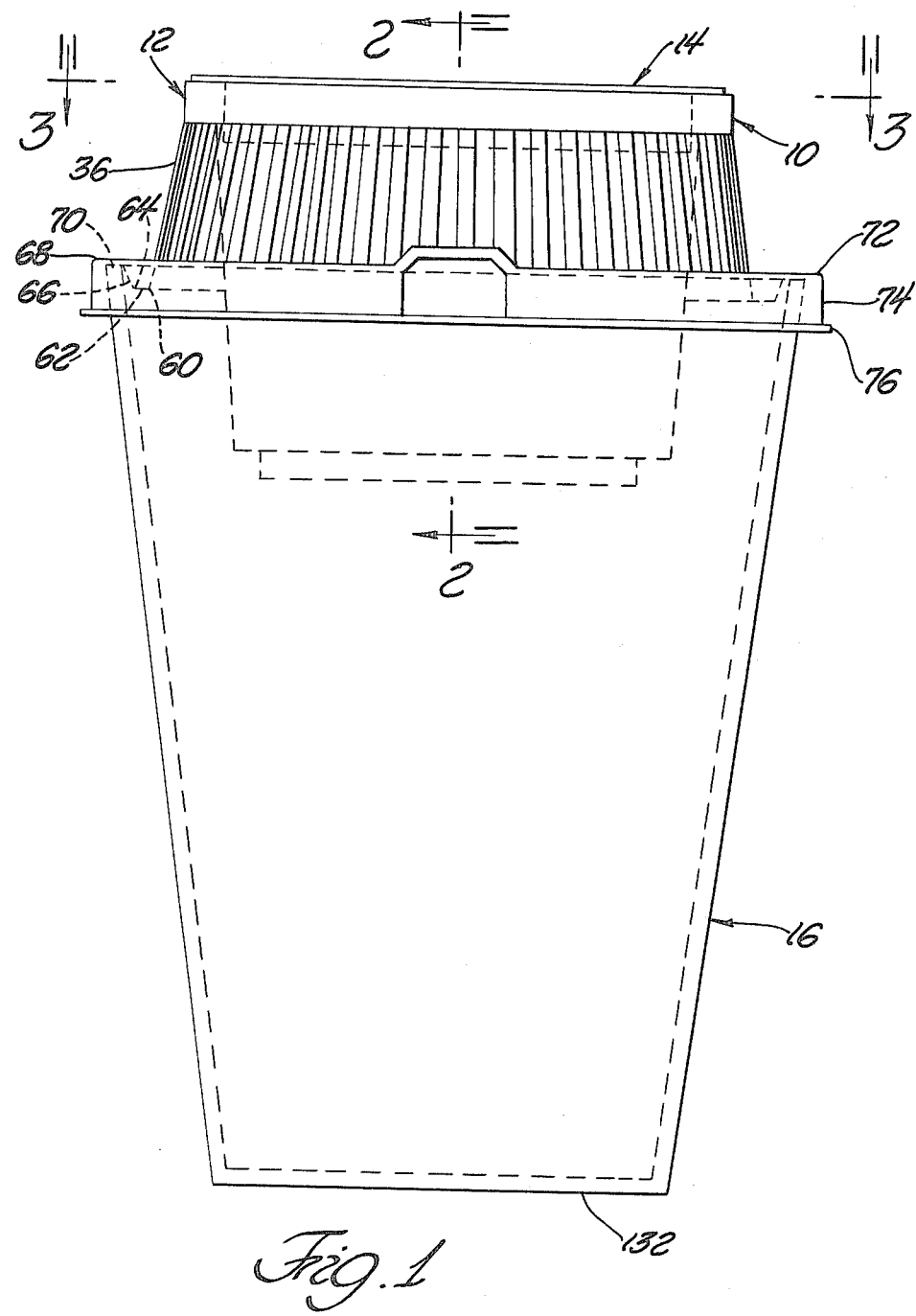
FIG. 1 is a front view of the preferred embodiment of this invention.

FIG. 1 shows the preferred embodiment of the invention shown generally at numeral 10. The apparatus 10 comprises a brew basket member 12, a cap member 14, and a cup member 16. The brew basket member 12 has a body 18 that is essentially in the shape of a right circular frustoconical section. The body 18 has sloping sides 20 that have ribs 22 forming ridges and valleys on the sides thereof. The main body side wall 20 has an interior side 24 and an exterior side 26. A horizontal wall portion 32 extends continuously, horizontally and directly from the vertical wall section 20. At a corner 34, a downwardly extending wall portion 36 exterior to wall surface 26 continues vertically downward continuously from and immediately connecting with wall portion 32.

A draft angle 42 is formed between the wall 20 and a vertical plumb line 40. A similar draft angle 38 is formed on the outer wall 36 with a vertical plumb line. These draft angles foster ease of mold design, manufacture, and subsequent nesting of the product.

At junction 44, horizontal extending wall section 46 extends radially horizontally away from section 42 forming a spout for conduit of liquids through chamber 48 and having a radially curved downward section 50. At junction 52, a horizontal wall section 54 extends radially away from wall section 36 to form a lip containing a chamber 56 for the allowance of air or gas to pass therethrough continuing through connecting conduit portion 58 exteriorly of the cup 16. Other than the spout sections 50 and 54, circularly around the rest of the bottom rimmed portion of the brew basket 12, the wall section 42 meets at junction 60 with a horizontally extending wall portion 62 and, at junction 64, an upwardly extending wall section 66 forms a right circular frustoconical section continuous from, extending from, and contiguous to horizontal section 62. At junction 68, a horizontal wall section 70 extends radially outwardly continuous with and contiguous to wall section 66. At junction 72, wall section 74, in the shape of a right circular cylindrical section, extends continuously, contiguous to wall section 70. A lip or rim 76, contiguous to wall section 74 and extending radially outward therefrom, provides the lower terminal wall structure of brew basket 12.

Wall section 20 at junction 80 connects continuous with bottom section 82 of the brew basket 12. Bottom section 82 has a peripheral raised portion 84 contiguous with lowered portions 86 and connected by intermediate vertical wall sections 88. Similar lowered portions 90 and raised portions 92 are arranged in a symetrical pattern interiorly inward from the outer perimeter 94 of the bottom section 82. A central raised conical portion 96 is provided for the centering of filter paper, prepackaged coffee, and the like. Portion 96 may, alternatively, be replaced by an aperture at the same location with the same horizontal dimensions. A plurality of apertures 98 are provided in bottom section 82 for the passage of brew therethrough to the coffee pot or cup member 16 below.

The cap member 14 is in the shape of a hollow dish. A bottom section 100 is in the shape of a right circular cylindrical disc. Cap 14 has upwardly extending right circular frustoconical section walls 102 contiguous with, continuous from, and extending above vertically radially outwardly from bottom portion 100. The walls 102 have ribs 104 forming ridges and valleys in the upward extending vertical wall portion 102. A termination lip 106 is provided around the outer perimeter 108 of the cap member 14.

Radially inward jogs 112, 114, 116 form notchlike areas in the outer periphery 108 of the cap member 14. The wall 102 and lip 106 follow this periphery so that space is provided between the interior side 119 of section 30 of the brew basket 12 and the radially inward exteriorly facing portion of the notches 112, 114, 116. This allows the passage of gas from the interior of the brew basket when the cap 14 is placed thereon while water is passing through apertures 118 in the bottom portion 100 of the cap member 14.

Figure 2:
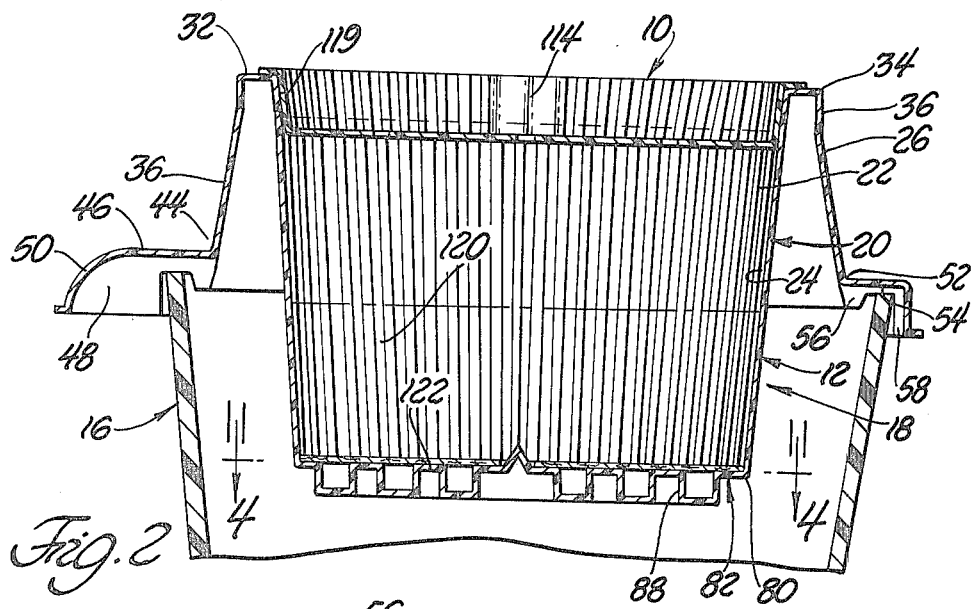
FIG. 2 is a partial cross-sectional view of the apparatus shown in FIG. 1 taken along the section lines 2—2 thereof.
Figure 3:
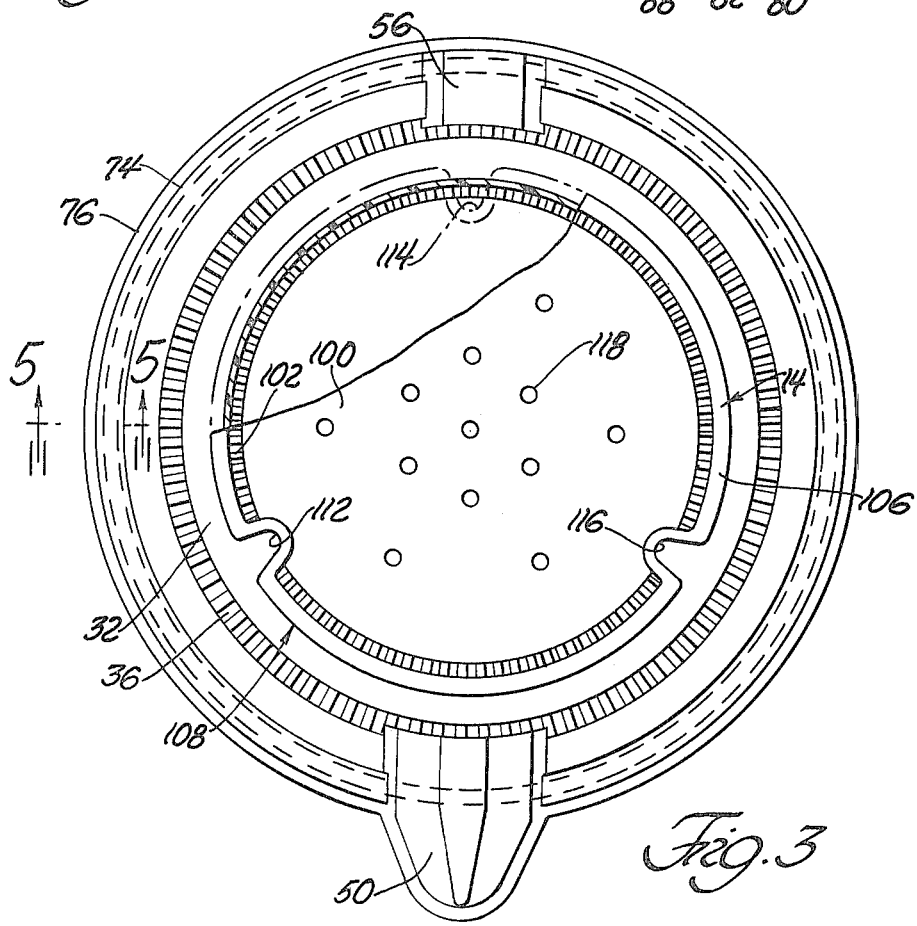
FIG. 3 is a top view of the apparatus shown in FIG. 1, partially broken away, taken along the section lines 3—3 thereof.
Figure 4:
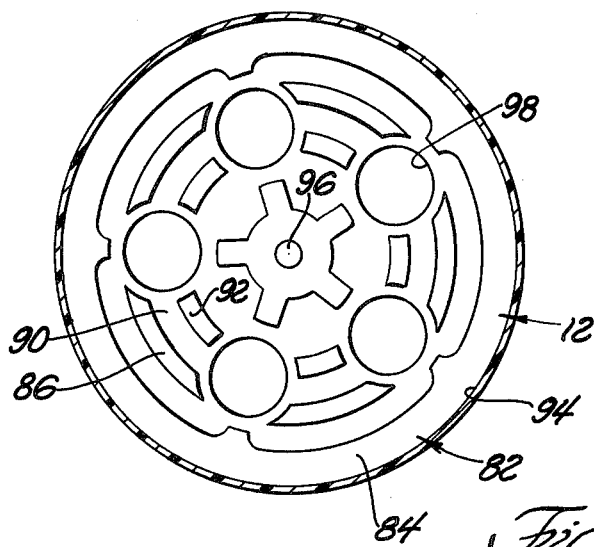
FIG. 4 is a transverse sectional view of the apparatus shown in FIG. 2 taken along the secton lines 4—4 thereof.

It can be readily seen that the cap member 14 can be pressed into a press fit engagement with wall surfaces 119 of the brew basket 14, and also be readily removed therefrom. When the cap is placed into the aforementioned engagement with the brew basket 14, an enclosed entity is provided wherein water may pass through the apertures 118 of the cap into the brew basket and the coffee indicated at numeral 120 contained within the brew basket, as shown in FIG. 2 may dissolve into the water. The filter paper 122 resting on bottom surfaces 82 of the brew basket provide a filtering of the solute through apertures 98 into the cup 16 below. The coffee pot or cup member 16 is in the shape of a right circular frustoconical section which is open at the top and has an enclosed bottom 130.

From the foregoing description of the structure of the preferred embodiment of this invention, it can be appreciated that the coffee once brewed and collected in the cup member 16 may be poured through conduit 48 and allow the passage of gases through conduits 56, 58 during such pouring. Further, the conduits 48, 56, 58 provide for the egress of gases while the brew is filling the cup 16. This obviates the necessity for any other apertures other than the apertures 48, 56, 58 in the brew basket to allow the venting of gases during the fill of the brew into the cup from the brew basket 12.

Figure 5:
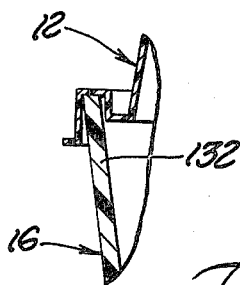
FIG. 5 is a partial detailed sectional view showing the cooperation of the lip of the brew basket with the cup member.

FIG. 5 is a cross-sectional detail showing the preferred embodiment of the radially outward downward exterior portions of the brew basket 14 in cooperation with the upward extending wall portion 132 of the cup member 16.

Figure 6:
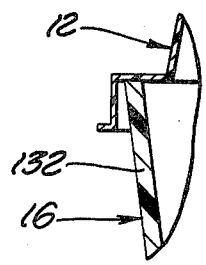
FIG. 6 is a partial sectional view of an alternative embodiment of the cooperation of a lip portion of the brew basket with the cup member.

FIG. 6 is an alternative embodiment showing a simpler construction but not having the lock features as shown in FIG. 5.

Figure 7:
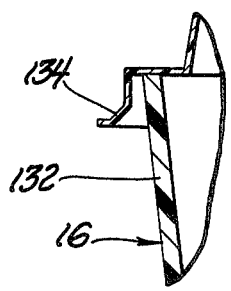
FIG. 7 is a further alternative partial sectional view showing the cooperation of the lip portion of the brew basket with the cup member.
Figure 8:
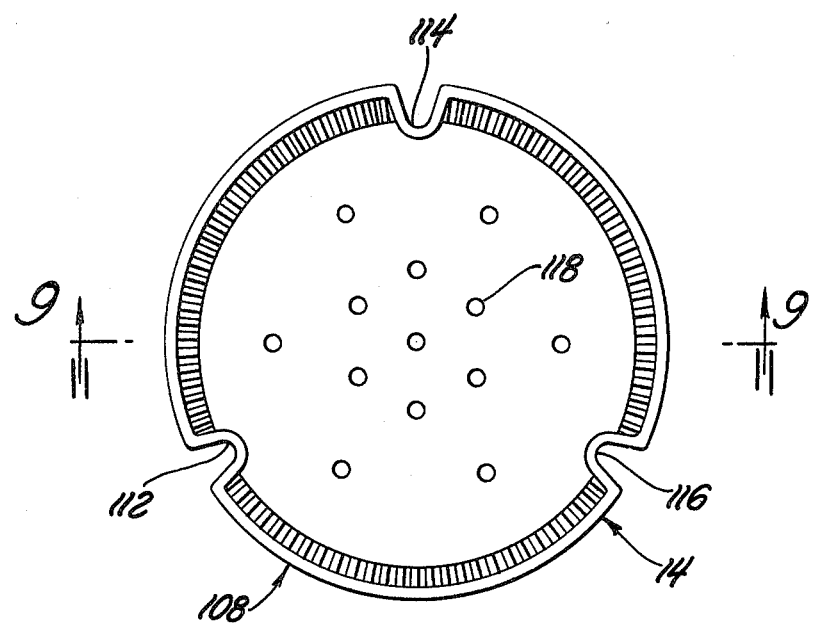
FIG. 8 is a top view of the cap member utilized in the embodiment shown in FIG. 1.
Figure 9:
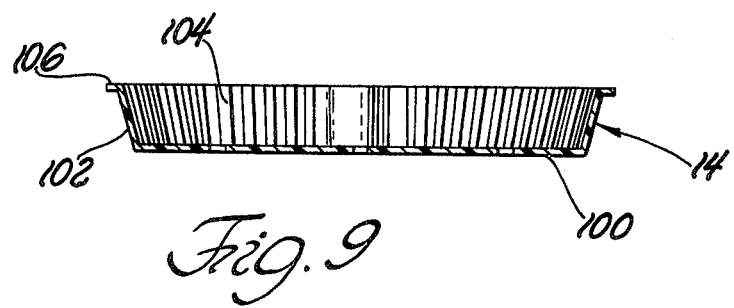
FIG. 9 is a transverse sectional view of the apparatus shown in FIG. 8.

FIG. 7 is a further alternative embodiment of the relationship between the downward radially outward portions of the brew basket 14 in mating relationship with the upward extending wall 32 of cup 16. In this alternative embodiment, an inclined plane portion 134 in the outer periphery of the brew basket allows for ease in the engagement of various diameters of cup members 16.

As can be appreciated from the foregoing specific descriptions of the draft angled components 12, 14 and 16, it can be appreciated that each of the three components, and a plurality of each of the components, can be nested, thus saving considerable space in shipping, storage, and handling. For example, because of the sloping sides of the frustoconical sides of the cup 16, a plurality of such cups can be nested together in a relatively small space. For another example, the sloping sides 102 of the cap 14 allow them to be stacked in a similar nesting relationship.

Similarly, the sloping interior surfaces 24 of the brew basket 12 allow similar nesting and stacking.

It can be further appreciated that when the composite portions 12, 14 and 16 of the brewing apparatus are assembled as shown in FIG. 1, an enclosed combined structure is provided that retains heat both within the brew basket and within the cup while allowing venting of gases through passages 48, 56, 58, and through the notches 112, 114, 116 of the cap.

In the preferred embodiment of this invention, the brew basket and cap are both made by vacuum form molding of plastic sheet material. Preferably, the thickness of the brew basket does not exceed 20 mils, and the preferable thickness is in the range of 6 to 16 mils. This is a substantial factor in reducing the cost, weight, and disposability after single use. At the same time, the ribs as shown in the drawings and described above, provide a substantial reinforcing element so that despite the relatively thin thickness of the walls, the walls are strong enough to withstand the stresses placed by holding the weight of coffee as well as stresses induced by heat and fluid pressures. Similarly apertures or conduits provided in both the bottom and the top of the combined structure of the cap and brew basket allow sufficient venting of the gases while retaining sufficient heat for brewing so that a reduced thickness wall can be utilized.

Similarly, the hills and valleys as shown in FIG. 2 in cross-section provided further additional strength for the bottom portion of the brew basket so that reduced thickness of plastic can be used throughout in that area.

Another function of providing upper and lower portions, that is, portions that are raised from relatively lower portions or portions that are depressed from relatively upper portions in the bottom portion of the brew basket, allow free flow of liquid through the filter paper and prevent clogging by undissolved coffee sediment or grounds that would otherwise inhibit the flow of the brew to the cup below. This is a substantial factor in controlling the speed of the brew as well as the completeness of the brew and recovery of the brew in the cup below.

Another factor in the reduced thickness of the plastic walls and bottom of the structure of the brew basket can be appreciated by the provision of a centering raised portion to center the filter paper. This prevents the shifting of the filter paper and thus laying bare an unfiltered area in which brew can pass without filtering.

In prior art devices, it has been necessary to provide notches or lips in the cup in order to facilitate flow. Prior art also requires apertures in the brew basket above and beyond those provided by the cap in order to allow proper venting.

In the preferred embodiment of this invention as described in detail above, this additional venting is not required because sufficient venting is provided by the chambers 48, 54, 58 in the brew basket itself to allow the passage of liquid therethrough over and above the top of the wall of the cup 16 and also allows the venting of gases to this part of cup 16.

In the preferred method of brewing coffee pursuant to this invention, a brew basket is provided of thin plastic dimensions as shown in the drawings, water is allowed to pass through the apertures in the cap to the interior chamber of the brew basket, where the coffee solute is in loose form over a filter paper or is in prepackaged form in filter paper. The brew basket itself allows brewing to take place within a closed environment, however allowing venting through the lip or notches in the cap. During the brewing process, the coffee is allowed to drip through the filter paper, and through the apertures in the bottom of the brew basket to the cup below. After the brewing process, the entire brew basket and cap may be disposed of as a single entity. This includes the grounds that are contained therein. This avoids manual handling of grounds for removal therefrom for subsequent washing, since subsequent washing is not necessary for a subsequent brew. Indeed, a fresh brew basket and cap may be utilized that has been uncontaminated by contact with coffee solution prior to making a fresh brew.

It can be appreciated from the foregoing description of the preferred embodiments of this invention that structure has been provided for brewing wherein the entire structure can be economically disposed of and thereby dispense with any washing step. It can be appreciated that successive batches of brews can be made without using the very same embodiments of structure, indeed entirely new embodiments of similar structure may be used. This is an important step in preserving the sanitation, flavor, purity and quality control, quantitatively and qualitatively, of successive brews with great precision.

From the foregoing, it can be appreciated that a brewing system apparatus for coffee has been provided comprising a brew basket apparatus and a pot, the brew basket, throughout its use in said system, being free of any contact of any coffee solution in excess of the capacity of the pot. That is, in a coffee brewing system, structure has been provided comprising a brewing basket and a pot, the brewing basket, throughout its use in the system, being free of any contact of coffee solute in excess of 40 grams. Apparatus has been provided for a process for brewing coffee limiting the resulting brewed coffee to be free of any contact of any surface in the apparatus used for brewing coffee which has been in contact with any coffee solution prior to that brewed. In such a coffee brewing system, the brew basket may be so small as to not exceed a mass of 10 grams of the combination of a brew basket and distributor plate not exceed a mass of 16 grams.

I claim:

1. In a brewing system for coffee, wherein the entire apparatus for brewing is designed for a single batch of brewing and is designed to be disposed of and not reused for a successive batch of brewing subsequent to the initial batch of brewing, in order to preserve the purity of each brew batch brewed with said system and maintaining each successive brew brewed with said brewing system absolutely and completely free of any contaminants from a prior brew made with said brewing system, the improvements comprising:

brewing structure having members symmetrical about a geometric central axis thereof;

said structure having an upper member, an intermediate member and a lower member;

said upper member being symmetrical about said axis;

said intermediate member being symmetrical about said axis;

said lower member being symmetrical about said axis;

relatively raised and relatively lowered portions of the bottom of said intermediate member;

said raised and lowered portions being symmetrical about said axis;

said upper member having primary liquid flow limiting means controlling the rate of hot water into a chamber formed by the composite of said upper member and said intermediate member;

said upper member having means venting gas from said chamber during said flow limited by said primary liquid flow limiting means said intermediate member having a central nub centered on said axis;

a filter paper portion in the shape of a circular disc having a central aperture operable to surround said nub and said nub limiting the horizontal translation of said filter paper portion horizontally away from said nub and said filter paper portion being located interiorly of said intermediate member and resting on said upper portion of the bottom of said intermediate member;

apertures arrayed symmetrically about said central axis in said bottom portion of said intermediate member and providing secondary liquid flow limiting means limiting the flow rate of brew from said chamber to said lower member;

said upper member being of a material selected from the group consisting of: plastic, coated paper, treated paper, foil, and laminated metallic foil; and said intermediate member being of a material selected from the group consisting of: plastic, coated paper, treated paper, foil, and laminated metallic foil.

2. In the system of claim 1, said lower member comprising a cup having side walls in the shape of a right circular frustoconical section, and being open at the top and having a relatively flat bottom, and being of a material consisting of the group of: plastic, coated paper, treated paper, and laminated metallic foil.

3. In the apparatus of claim 1, said intermediate member having a flanged portion extending horizontally proximate the top of said lower member and having an upper raised spout portion in said flange member serving as a conduit for flowing liquid out of said lower member after the brew, and said flange, at a position substantially 180 degrees from the position of said spout, having a lip acting in cooperation with the top of said lower member to provide a conduit for the entrance of gases to replace the space created by the flow of liquid from the lower member during the flow of completed brew from the lower member through the aforementioned spout in said flange.

4. In the system of claim 1, said intermediate member being in slip fit with said upper member.

5. In the system of claim 1, said intermediate member being in yieldable interference fit with said lower member.

6. In the system of claim 1, said upper member and said intermediate member being made of material having a melting point substantially above 212 degrees Fahrenheit and substantially below 600 degrees Fahrenheit.

7. In the system of claim 1, said intermediate member and said upper member being made of a material of substantially less than 20/1000ths inch in thickness throughout.

8. In the system of claim 1, said lower member being of a material that is inoperable to withstand the temperature of a hot plate.

9. In the system of claim 1, said intermediate member being made of a material that is operable to melt or decompose above the temperature of 230 degrees Fahrenheit.

10. In the system of claim 1, said intermediate member being nestable with another one of said intermediate members.

11. In the system of claim 1, said upper member being nestable with another one of said upper members.

12. In the system of claim 1, said lower member being nestable with another one of said lower members.

13. In the system of claim 1, said intermediate member being made of a material that will deform above 212 degrees Fahrenheit.

14. In the apparatus of claim 1, the combination of said intermediate member and said upper member having a combined mass not exceeding 10 grams.

15. In a brewing system for coffee, wherein the entire apparatus for brewing is designed for a single batch of brewing and is designed to be disposed of and not reused for successive batches of brewing subsequent to the initial batch of brewing, in order to preserve the purity of each brew batch brewed with said system and maintaining each successive brew brewed with said brewing system absolutely and completely free of any contaminant from a prior brew made with said brewing system, the improvements comprising:

brewing structure having an upper member, an intermediate member and a lower member;

relatively raised on relatively lowered portions of the bottom of said intermediate member;

said upper member having primary liquid flow limiting means controlling the rate of hot water into a chamber formed by the composite of said upper member and said lower member;

said upper member having means venting gas from said chamber during said flow limited by said primary liquid flow limiting means;

a filter paper portion being located interiorly of said intermediate member and resting on said upper portion of the bottom of said intermediate member;

said brewing structure having a geometric central axis thereof;

an aperture arrayed symetrically about said central axis in said bottom portion of said intermediate member and providing secondary liquid flow limiting means limiting the flow rate of brew from said chamber to said lower chamber;

said upper member being of a material selected from a group consisting of: plastic, coated paper, treated paper, foil, and laminated metallic foil; and said intermediate member being of a material selected from the group consisting of: plastic, coated paper, treated paper, foil, and laminated metallic foil.

16. In the system of claim 15, said lower member comprising a cup being of a material consisting of the group of: plastic coated paper, treated paper, and laminated metallic foil.

17. In the apparatus of claim 15, said intermediate member having a flange portion extending horizontally proximate the top of said lower member and having an upper raised spout portion in said flange member serving as a conduit for flowing liquid out of said lower member after the brew, and said flange, at a position substantially 180° from the position of said spout, having a lip acting in cooperation with the top of said lower member to provide a conduit for the entrance of gasses to replace the space created by the flow of liquid from the lower member during the flow of completed brew from the lower member through the aforementioned spout in said flange.

18. In the system of claim 15, said intermediate member being in a slip fit with said upper member.

19. In the system of claim 15, said intermediate member being in yieldable interference fit with said lower member.

20. In the system of claim 15, said upper member and said intermediate member being made of a material having a melting point substantially above 212° Fahrenheit and substantially below 600° Fahrenheit.

21. In the system of claim 15, said intermediate member and said upper member being made of a material substantially less than 20/1000ths inch in thickness throughout.

22. In the system of claim 15, said lower member being made of a material that is inoperable to withstand the temperature of a hotplate.

23. In the system of claim 15, said intermediate member being made of a material that is operable to melt or decompose above the temperature of 230° Fahrenheit.

24. In the system of claim 15, said intermediate member being nestable with another one of said upper members.

25. In the system of claim 15, said upper member being nestable with another one of said upper members.

26. In the system of claim 15, said lower member being nestable with another one of said lower members.

27. In the system of claim 15, said intermediate member being made of a material that will deform above 212° Fahrenheit.

28. In the apparatus of claim 15, the combination of said intermediate member and said upper member having a combined mass not exceeding 10 grams.

* * * * *